United States Patent
Komata et al.

(10) Patent No.: US 6,209,382 B1
(45) Date of Patent: Apr. 3, 2001

(54) METHOD OF CONSTITUTING DATA BASE FOR CORRECTING LOAD CELL OUTPUT, AND WEIGHTING CONTAINER

(75) Inventors: Chikara Komata; Laiping Su; Mitsuhide Muramatsu, all of Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/011,902

(22) PCT Filed: Aug. 15, 1996

(86) PCT No.: PCT/JP96/02303

§ 371 Date: Feb. 23, 1998

§ 102(e) Date: Feb. 23, 1998

(87) PCT Pub. No.: WO97/08520

PCT Pub. Date: Mar. 6, 1997

(30) Foreign Application Priority Data

Aug. 25, 1995 (JP) .................................................. 7-217615

(51) Int. Cl.[7] ........................ G01G 23/01; G01G 19/12; G01G 21/26
(52) U.S. Cl. ............................................. 73/1.13; 702/101
(58) Field of Search .................................. 73/1.13, 1.15; 702/108, 102, 41, 42; 280/DIG. 1

(56) References Cited

U.S. PATENT DOCUMENTS

| | | | |
|---|---|---|---|
| 411,269 | * | 9/1889 | Taylor .................................. 73/1.13 |
| 3,396,573 | * | 8/1968 | Blubusch .............................. 73/1.13 |

(List continued on next page.)

FOREIGN PATENT DOCUMENTS

| | | | |
|---|---|---|---|
| 3015378 | * | 10/1981 | (DE) ..................................... 73/1.13 |
| 3424280A1 | | 9/1986 | (DE) . |
| 0 625 697 A1 | | 11/1994 | (EP) . |
| 50-135155 | | 11/1975 | (JP) ................................. G01G/19/14 |
| 76928 | * | 7/1980 | (JP) ....................................... 73/1.13 |
| 64-6827 | | 1/1989 | (JP) ................................. G01G/23/01 |
| 6-294679 | | 10/1994 | (JP) ................................. G01G/19/12 |
| 6-313740 | | 11/1994 | (JP) ................................. G01L/1/22 |
| 8-85152 | | 4/1996 | (JP) ................................. B29C/57/10 |
| 89/04950 | | 6/1989 | (WO) .............................. G01G/19/12 |
| 8568 | * | 9/1989 | (WO) ..................................... 73/1.13 |
| 23275 | * | 10/1994 | (WO) . |

OTHER PUBLICATIONS

Patent Abstracts of Japan, Publication No. 0604424, dated Feb. 1, 1994, Hisaichi "Factors/Positioning method for container".

Abstracts of JP 8–285667 A dated Nov. 1, 1996 by so et al (JPO Abstract JP 408285667A entitled Loaded Weight Measuring Device and Derwent Abstract Acc–No 1997–024833).*

*Primary Examiner*—Thomas P. Noland
(74) *Attorney, Agent, or Firm*—Sughrue, Mion, Zinn, Macpeak & Seas, PLLC (57) ABSTRACT

A weight vessel adapted for constructing a database for correcting outputs of load measurement sensing devices, in which the weight of the weight vessel can be changed in a desired arbitrary pitch without requiring any superfluous labor, any equipment such as a balance weight, and any dangerous work. The weight vessel comprises: a vessel body (61) shaped like a hollow box so that a liquid can be reserved in the inside of the vessel body; an injection inlet (61c) formed in an upper portion (61b) of the vessel body (61); a discharge outlet (61f) formed in a lower portion of the vessel body (61); and a scale (61e) formed on a side portion (61d) of the vessel body (61) for indicating a value corresponding to the amount of the liquid reserved in the vessel body (61); wherein at least the side portion provided with the scale thereon in the sides of the vessel body is formed of a transparent or semitransparent member so that the amount of the liquid in the vessel body (61) can be seen through the transparent or semitransparent member.

4 Claims, 9 Drawing Sheets

U.S. PATENT DOCUMENTS

| | | | |
|---|---|---|---|
| 3,439,524 | * | 4/1969 | Rogers ................................. 73/1.13 |
| 4,549,267 | * | 10/1985 | Draborski, Jr. ...................... 701/124 |
| 4,799,558 | * | 1/1989 | Griffen ............................. 177/211 X |
| 5,456,119 | * | 10/1995 | Nakazaki et al. ........... 73/862.472 X |
| 5,877,454 | * | 3/1999 | Uehara et al. .................... 73/1.13 X |
| 5,883,337 | * | 3/1999 | Dolan et al. ...................... 73/1.13 X |

\* cited by examiner

METHOD OF CONSTITUTING DATA BASE FOR CORRECTING LOAD CELL OUTPUT, AND WEIGHTING CONTAINER

TECHNICAL FIELD

The present invention relates to a method of constructing an output correction database indicating output characteristics of a plurality of load measurement sensing devices such as strain gauge sensors, or the like, in the condition that the sensing devices are attached to a vehicle such as a truck, a ship, a train, an airplane, or the like, so that the database is used for calculating correction values for correcting vehicle characteristics, or the like, in which loads imposed on the respective sensing devices are changed in accordance with the variations in output characteristics of the sensing devices and the structure of the vehicle, when the load of the vehicle is measured on the basis of the sum of the outputs of the sensing devices, or the like. The present invention further relates to a weight vessel adapted to be used when the database is constructed by the above method.

BACKGROUND ART

The measurement of load of a vehicle may be provided for a large-sized vehicle such as a truck, etc., for example, for the purpose of preventing traffic accidents such as rolling accidents caused by overload, etc., and preventing acceleration of deterioration of the vehicle.

Conventionally, the measurement of load of a vehicle is performed in the condition that the vehicle, which is a subject of the measurement, is placed on a platform weighing machine so called "KANKAN" in Japanese. However, because a large-scaled equipment and a large installation space are required for the measurement, the number of platform weighing machines allowed to be installed in the space is limited so that numbers of vehicles cannot be measured. Furthermore, the cost for installing the platform weighing machines increases.

Recently, therefore, a load measuring apparatus which is mounted on the vehicle per se to measure the load of the vehicle is provided.

In an on-vehicle type conventional load measuring apparatus, for example, load measurement sensing devices such as strain gauge sensors, or the like, are designed to be attached to suitable positions between front, rear, left and right places of carrier frames and circular-arc-like leaf springs interposed between left and right opposite end portions of front and rear axles so that the load is measured on the basis of the sum of signals outputted from the sensing devices respectively proportional to the loads imposed on the front, rear, left and right sensing devices.

When the outputs of the respective sensing devices are used directly for the measurement of the load of the vehicle by the aforementioned load measuring apparatus, the outputs of the sensing devices may become values which do not correspond to the loads actually imposed on the respective sensing devices because of the variations in the output characteristics of the sensing devices even in the case where the center of gravity of a baggage is located substantially at a center of a carrier so that the load from the baggage or carrier is evenly imposed on the respective sensing devices.

That is, there is a risk that the correct values of the load of the baggage placed on the carrier cannot be obtained on the basis of the sum of the outputs of the respective sensing devices.

Further, the outputs of the sensing devices depend also on vehicle characteristics defined in accordance with the structure of the vehicle.

In measurement of a load on a vehicle by using such a plurality of sensing devices, it becomes necessary to correct the outputs of the sensing devices in accordance with the individual output characteristics and vehicle characteristics.

As described above, calculation of correction values for correcting the output characteristics of the respective sensing devices and calculation of the output correction values of the respective sensing devices in accordance with the vehicle characteristics are performed on the basis of calculation of coefficients to make the sum of the outputs of the respective sensing devices accord with a value corresponding to a known load value in the condition that the value of the load on the carrier is known. Particularly, correction values corresponding to the output characteristics of the sensing devices are calculated after the loaded state is adjusted so that the center of gravity of the carrier in the loaded state is made coincident with the center of gravity of the carrier in the tare or non-loaded state.

Both the calculation of the output characteristics of the sensing devices and the calculation of the output correction values of the sensing devices in accordance with the vehicle characteristics are performed each time by suitably increasing/decreasing the weight value of a weight on the carrier.

That is, the calculation of the output correction values of the load measurement sensing devices is equivalent to the calculation of correction values or correction equations for the sensing devices on the basis of a database constructed by calculation of the changes of the output characteristics of the respective sensing devices corresponding to the weight. It is therefore necessary to fetch the outputs of the respective sensing devices to construct the database while the load on the carrier is increased/decreased gradually and while the load per se after the increase/decrease is always made known.

Therefore, in order to make the load per se after increased/decreased always known while the load of the carrier is increased/decreased gradually at the time of the work of calculating the output correction values, it is considered that weights such as balance weights. etc., each having a known mass value are placed on a single position or a plurality of places on the carrier so that the load is evenly imposed on the sensing devices and the number of weights per place is increased/decreased equally whenever the outputs of the sensing devices have been measured and fetched as data.

Because such balance weights to be used by being mounted on the carrier are, however, large both in weight and in external size, a conveying apparatus such as a forklift, a crane, etc. must be used separately for carrying the balance weights and increasing/decreasing the number of the balance weights on the carrier. Accordingly, there is a disadvantage that not only surplus labor and equipment are required but also dangerous work such as slinging work for the balance weights must be carried out in the case of a crane.

Further, the weight per balance weight is predetermined so that the pitch for increasing/decreasing the load is limited by the predetermined balance weight. There arises a disadvantage that the change of the output of each sensing device cannot be calculated in a pitch smaller than the weight of one balance weight or various kinds of balance weights different in weight must be prepared in order to calculate the change of the output in a pitch as small as possible.

Taking the aforementioned circumstances into consideration, a first object of the present invention is to provide a method of constructing a database for correcting outputs of a plurality of load measurement sensing devices such as strain gauge sensors, etc., for measuring load of a vehicle so that the database is used for calculating correction values for correcting the outputs of the sensing devices in accordance with output characteristics of the sensing devices and vehicle characteristics, and so that the database indicating the output characteristics of the sensing devices can be constructed by simple labor.

A second object of the present invention is to provide a weight vessel adapted for carrying out the database constructing method so that the weight can be changed in a desired arbitrary pitch without requiring any surplus labor, any equipment such as balance weights, and any dangerous work.

DISCLOSURE OF THE INVENTION

In order to achieve the above first object, according to the present invention, provided is a method of constructing an output characteristic correction database indicating output characteristics of a plurality of load measurement sensing devices disposed in a vehicle at portions supporting a carrier of the vehicle so that the database is to be used to calculate correction values for correcting the outputs of the sensing devices in accordance with vehicle characteristics determined on the basis of variations in output characteristic of the sensing devices and a structure of the vehicle, comprising the steps of: changing an amount of a liquid contained in a weight vessel placed on the carrier to thereby change weight of the weight vessel containing the liquid while making a value of the weight of the weight vessel containing the liquid known; and collecting and storing at least one of the amount of the liquid and the weight of the weight vessel while relating it to the outputs of the sensing devices whenever the amount of the liquid in the weight vessel is changed.

In the above method of constructing a database for correcting outputs of load measurement sensing devices, according to the present invention, a plurality of the weight vessels are placed at lengthwise and widthwise equal intervals on the carrier; and the outputs of the sensing devices are collected and stored so as to be related to at least one of the amounts of the liquid in the weight vessels and the weight values of the weight vessels in a condition that the weight values of the weight vessels are made equal to each other.

In order to achieve the above second object, according to the present invention, the above-mentioned weight vessel comprises: a vessel body shaped like a hollow box so that a liquid can be reserved in the inside of the vessel body; an injection inlet formed in an upper portion of the vessel body; a discharge outlet formed in a lower portion of the vessel body; and a scale formed on a side portion of the vessel body so as to indicate a value corresponding to the amount of the liquid reserved in the vessel body; wherein at least the side portion provided with the scale in side portions of the vessel body is formed of a transparent or semitransparent member so that the amount of the liquid in the vessel body can be seen through the transparent or semitransparent member.

In the above weight vessel, according to the present invention, rotatable caster wheels are attached to at least three corner portions on a lower end of the vessel body to thereby make the vessel moveable.

In the above weight vessel, according to the present invention, shock absorbers are interposed between corner portions of the vessel body and the caster wheels respectively so that the shock absorbers can be expanded/contracted to come near to/go far from a ground surface of the caster wheels and so that the vessel body is urged to go far from the ground surface with respect to the caster wheels against loads of the vessel body and the liquid in the vessel body.

In the above weight vessel, according to the present invention, the shock absorbers are contracted to bring the vessel body into contact with the ground surface when the amount of the liquid in the vessel body reaches a predetermined value, and wherein contraction limiting members are further provided so that the contraction of the shock absorbers is limited in the condition that the vessel body is brought into contact with the ground surface.

In the method of constructing a database for connecting the outputs of load measurement sensing devices according to the present invention, the known weight of the weight vessel containing the liquid in the weight vessel is increased/decreased by increasing/decreasing the amount of the liquid in the weight vessel. Accordingly, the weights imposed on the sensing devices can be changed easily in an arbitrary pitch without requiring any troublesome balance weight increasing/decreasing work using a conveying apparatus such as a forklift, a crane, or the like, as in the conventional case where balance weights are used and without the necessity of separately preparing in advance various kinds of balance weights different in weight. Accordingly, the database indicating the changes of the output characteristics of the sensing devices corresponding to the changes of the weights imposed on the sensing devices can be constructed easily.

Further, in the method of constructing a database for correcting the outputs of the load measurement sensing devices according to the present invention, the balance of weight imposed on the carrier is made uniform by the plurality of weight vessels having weights made equal to each other. Accordingly, the changes of the weights in the output characteristics of the sensing devices containing the influence of the vehicle characteristics determined on the basis of the structure of the vehicle can be collected easily and stored in the form of a database.

Further, in the weight vessel according to the present invention, the amount of liquid reserved in a box-like vessel body can be confirmed easily by means of the scale provided at a side portion of the vessel body. Furthermore, by confirming the weight of the vessel body per se and the specific gravity of the liquid in advance, the weight of the whole of the vessel body can be calculated easily on the basis of the amount of the liquid in the vessel body observed by means of the scale.

Further, by making the vessel body empty, the weight vessel can be carried only with the light weight of the weight vessel per se. The weight vessel can be carried safely without use of any conveying apparatus such as a forklift, a crane, or the like, unlike the conventional case where balance weights are used. Further, the increase/decrease of the weight of the weight vessel can be performed easily by injecting the liquid into the vessel body through the injection inlet and discharging the liquid out of the vessel body through the discharge outlet.

Further, in the weight vessel according to the present invention, by providing caster wheels at least at three corner portions so as to rotate on a lower end of the vessel body, the vessel body can be moved easily so as not to be lifted from the ground surface.

Further, in the weight vessel according to the present invention, the vessel body comes far from the ground surface of the caster wheels by the urging force of the shock absorbers. Accordingly, the carrying of the weight vessel can be performed easily by means of the rotation of the caster wheels.

Further, in the weight vessel according to the present invention, by making the amount of the liquid in the vessel body reach a predetermined value to make the shock absorbers contract, the vessel body is brought into contact with the ground surface. Accordingly, if the weight of the weight vessel is increased to some degree, the weight vessel can be fixed by the contact of the vessel body with the ground surface. Furthermore, the contraction of the shock absorbers is limited by the contraction limiting members in this condition. Accordingly, the shock absorbers are prevented from being worn out and being damaged in the continuous contracting state due to continuous reception of overload.

BRIEF DESCRIPTION OF THE DRAWINGS

FIGS. 2(*a*) and 2(*b*) are explanatory views of a caster wheel portion of the weight vessel depicted in FIG. 1, FIG. 2(*a*) shows an empty state in the weight vessel, and FIG. 2(*b*) shows a state in which a predetermined amount of water is reserved in the weight vessel;

FIGS. 5(*a*) and 5(*b*) are explanatory side and plan views, respectively, showing places of a vehicle in which the load measurement sensing devices having outputs corrected in accordance with correction values obtained on the basis of the database constructed by the procedure in FIG. 4 are disposed;

BEST MODE FOR CARRYING OUT THE INVENTION

An embodiment of the present invention will be described below with reference to FIGS. 1 through 10.

First, referring to FIGS. 5(*a*) and 5(*b*), description will be made about the places in a vehicle where sensing devices of a ground type of load measuring apparatus, which is a subject of construction of an output-correcting database, are disposed by using weight vessels according to an embodiment of the present invention.

Figure 5A:
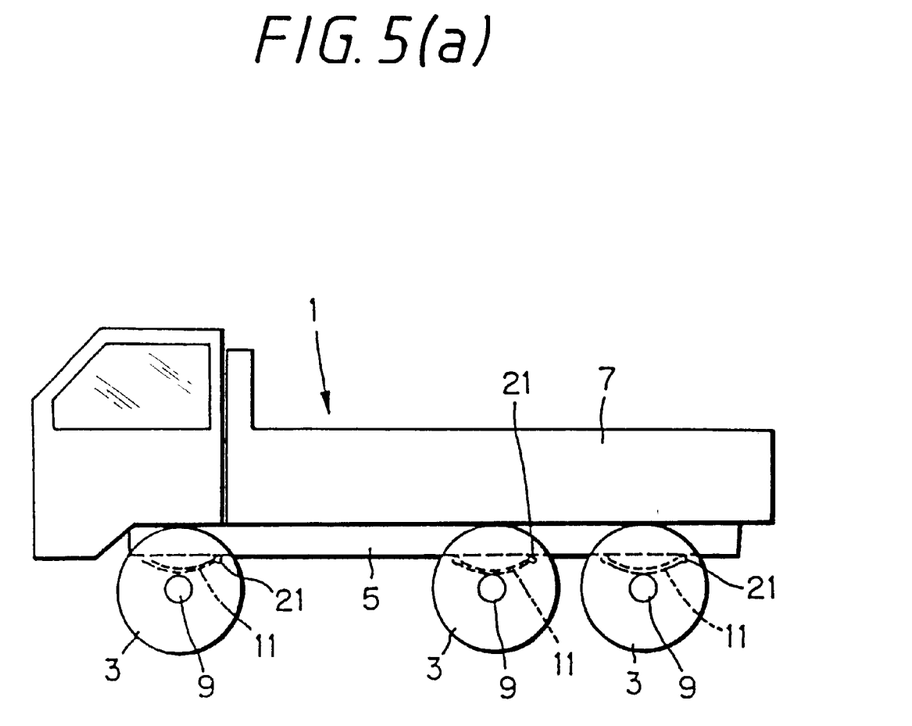
Figure 5B:
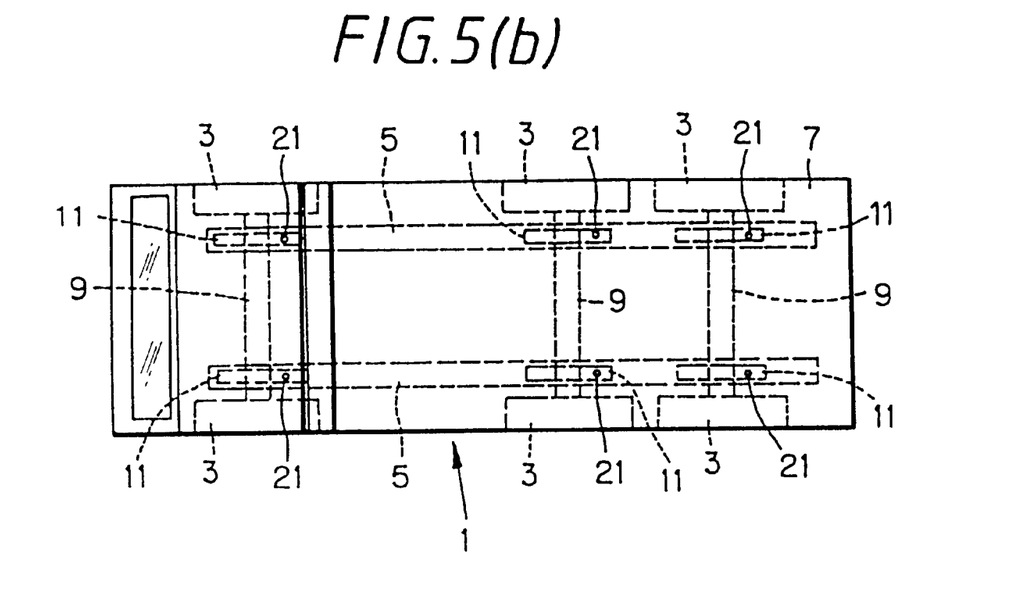

FIG. 5(*a*) is a side view of a vehicle and FIG. 5(*b*) is a plan view of the vehicle. The vehicle 1 has wheels 3, carrier frames 5, and a carrier 7.

The wheels 3 are provided by six in total, in the front, middle and rear portions on the left and right sides, respectively. The pairs of front, middle and rear wheels are supported by front, middle and rear axles 9, respectively, at their widthwise or laterally opposite ends, respectively.

The carrier 7 is supported on the carrier frames 5. Pairs of front, middle and rear positions separated on the left and right sides at a distance on the carrier frames 5 are supported, through leaf springs 11, by pairs of left and right end positions of the respective front, middle and rear axles 9.

Figure 6:
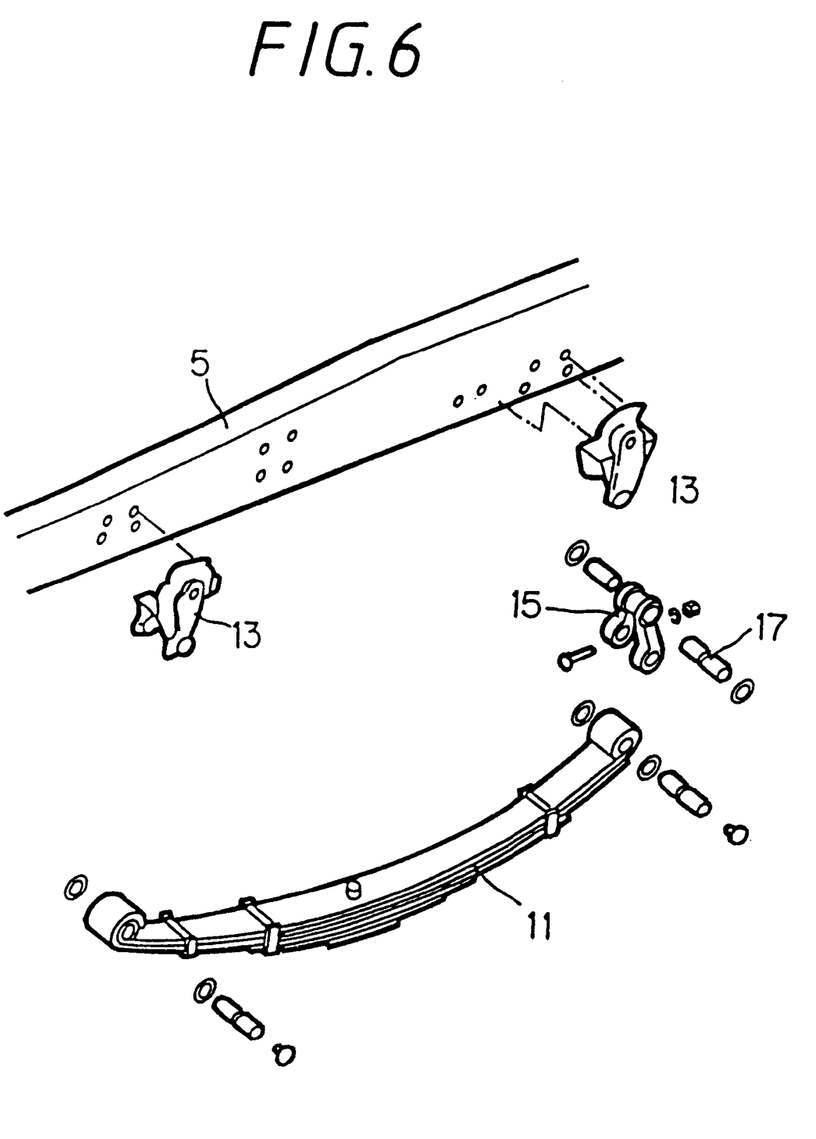
FIG. 6 is an exploded perspective view of a structure in which leaf springs depicted in FIGS. 5(*a*) and 5(*b*) are supported to carrier frames of a vehicle.

As shown in FIG. 6 which is an exploded perspective view of a structure for making the carrier frames support the leaf springs 11 of FIGS. 5(*a*) and 5(*b*), each of the leaf springs 11 is formed from belt-like spring leaves which are placed one upon another so as to be substantially shaped like a substantially circular arc curved convexly toward the ground. The longitudinal opposite ends of the leaf spring 11 are supported by two brackets 13 attached on the carrier frame 5 at front and rear positions separated at a distance. Particularly, the rear end portion of the leaf spring 11 on the rear side of the vehicle 1 is supported by a shackle 15 interposed between the bracket 13 and the leaf spring 11 so as to be rockable with respect to the bracket 13.

In FIG. 6, the reference numeral 17 designates a shackle pin (corresponding to the "portions supporting a carrier of the vehicle") which connects the bracket 13 and the shackle 15 to each other so as to be rockable.

In the vehicle 1 configured as described above, load measuring sensing devices 21 (corresponding to the "sensors") are disposed in six shackle pins 17 which are disposed in the pairs of front, middle and rear places on the left and right sides of the vehicle 1 so as to connect the brackets 13 and the shackles 15 to each other.

Figure 7:
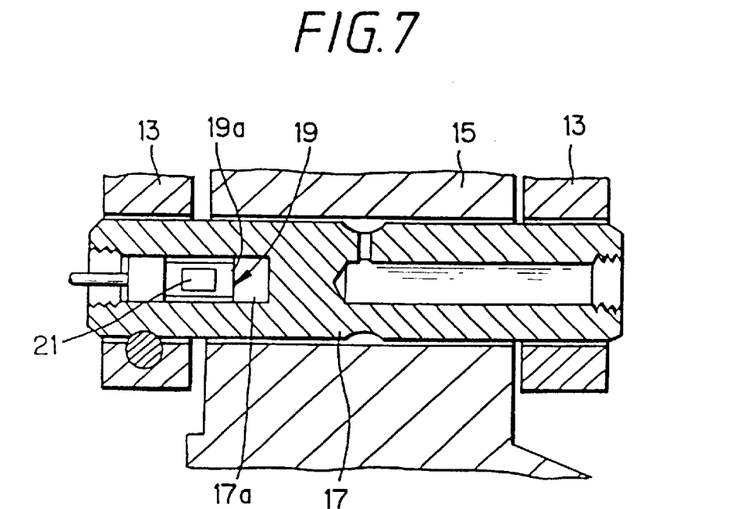
FIG. 7 is a sectional view showing a sensing device provided in a shackle pin depicted in FIG. 6.

In this embodiment, each of the sensing devices 21 is constituted by a magnetostriction type gauge sensor. As shown in FIG. 7 which is a sectional view showing a sensing device provided in the shackle pin depicted in FIG. 6, the sensing device 21 is attached to a web 19a of a retaining member 19 received in a hole 17a formed along the axial direction from one end of the shackle pin 17.

Incidentally, in the case where the sensing device 21 is of a magnetostriction type, the sensing device 21 is fitted into a receiving hole (not shown) formed in the web 19a.

Figure 8:
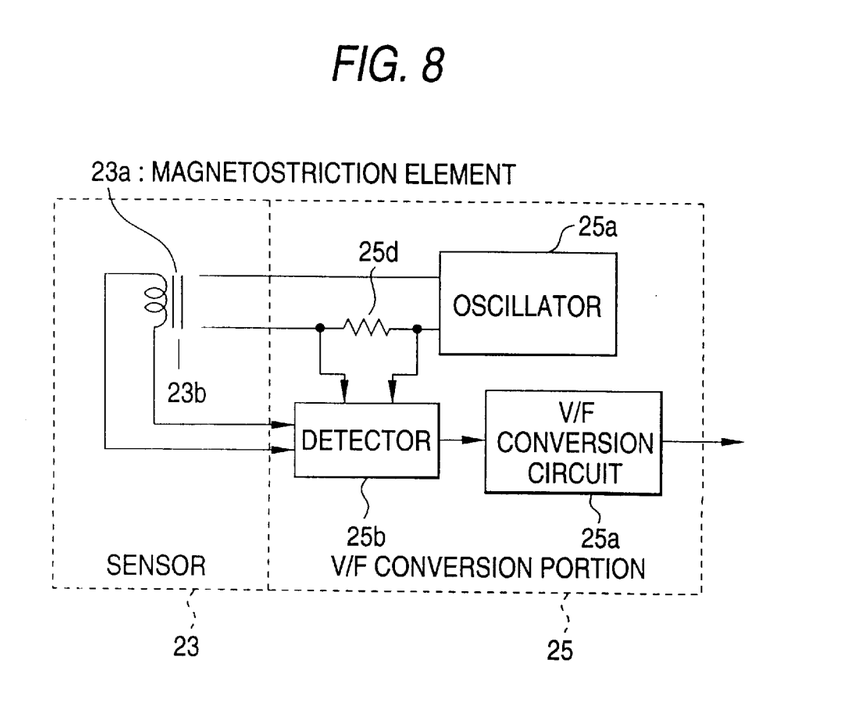
FIG. 8 is a circuit diagram, partly in block, showing the configuration of the sensing device depicted in FIG. 7.

Each of the six sensing devices 21 respectively disposed in the shackle pins 17 located in the front, middle and rear places on the left and right sides is constituted by a sensor 23, and a voltage-to-frequency conversion portion (hereinafter referred to as V/F conversion portion) 25 as shown in FIG. 8 which is a block diagram of the sensing device 21.

The sensor 23 is constituted by a magnetostriction element 23a, and a transformer 23b using the magnetostriction element 23a as a magnetic circuit.

The V/F conversion portion 25 has an oscillator 25a connected to a primary winding of the transformer 23b, a detector 25b connected to a secondary winding of the transformer 23b, and a V/F conversion circuit 25c connected to the detector 25b.

The sensing device 21 is configured to make a current flow into the primary winding of the transformer 23b on the basis of the output signal of the oscillator 25a to thereby induce an AC voltage in the secondary winding of the transformer 23b, make the detector 25b convert the AC voltage into a DC voltage and make the V/F conversion circuit 25c convert the DC voltage into a pulse signal of a frequency proportional to the value of the DC voltage to output the pulse signal to the outside.

Incidentally, a resistor 25d having a high resistance value is connected between the oscillator 25a and the primary winding of the transformer 23b. The voltage value of the AC voltage induced in the primary winding of the transformer 23b is prevented from changing by the resistor 25d even in the case where the output signal of the oscillator 25a more or less changes.

Further, the conversion of the AC voltage, induced in the secondary winding of the transformer 23b, into the DC voltage by the detector 25b is performed by multiplication of the AC voltage by a voltage generated between the opposite ends of the resistor 25d, so that noise components contained in the AC voltage are reduced by detection based on the multiplication.

Further, in the sensing device 21, the permeability of the magnetostriction element 23a changes correspondingly to the load imposed on the magnetostriction element 23a. As a result, the AC voltage induced in the secondary winding of the transformer 23b changes correspondingly to the output signal of the oscillator 25a, so that the frequency of the pulse signal outputted from the V/F conversion circuit 25c changes.

Figure 9:
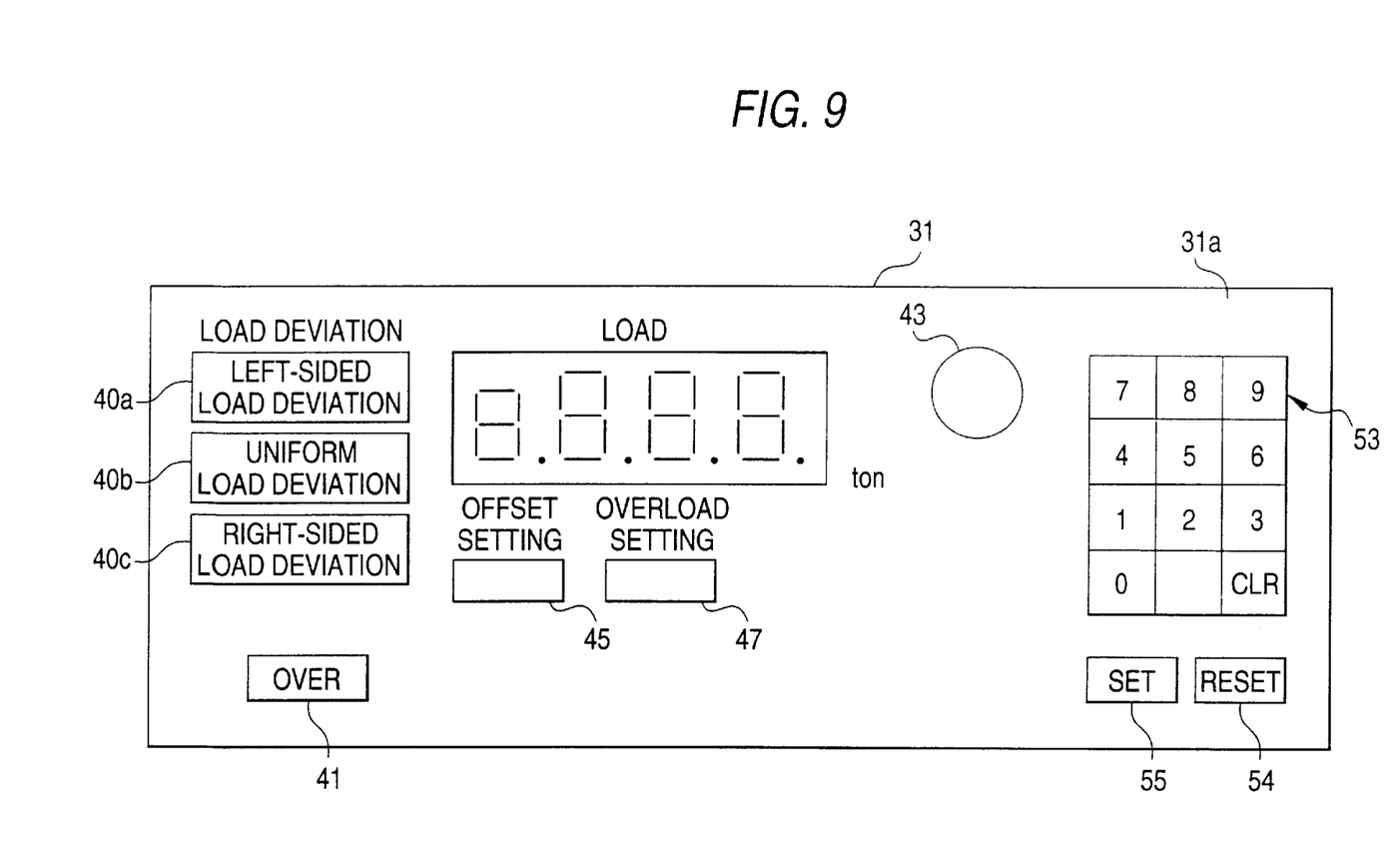
FIG. 9 is a front view of a load meter for calculating the load of a vehicle on the basis of the outputs of the respective sensing devices depicted in FIG. 7.

The detection of one-sided load of the vehicle 1 and the measurement of load on the basis of the outputs of the respective sensing devices 21 disposed in the shackle pins 17 in the front, middle and rear places on the left and right sides are performed by a micro-computer 33 disposed in a load meter 31 shown in FIG. 9 which is a front view thereof.

A load indication portion 37 which is constituted, for example, by a group of 7-segment light-emitting diodes for indicating the load measured by the micro-computer 33, three load indication lamps 40a to 40c for indicating a left-sided state, a uniform state and a right-sided state respectively, an overload indication lamp 41 for indicating the fact that the measured load exceeds a predetermined maximum load value, an alarm buzzer 43 for reporting a state of one-sided load and a state of overload, an offset adjustment value setting key 45, an overload value setting key 47, ten keys 53, a rest key 54 and a set key 55 are disposed on a front surface 31a of the load meter 31.

Figure 10:
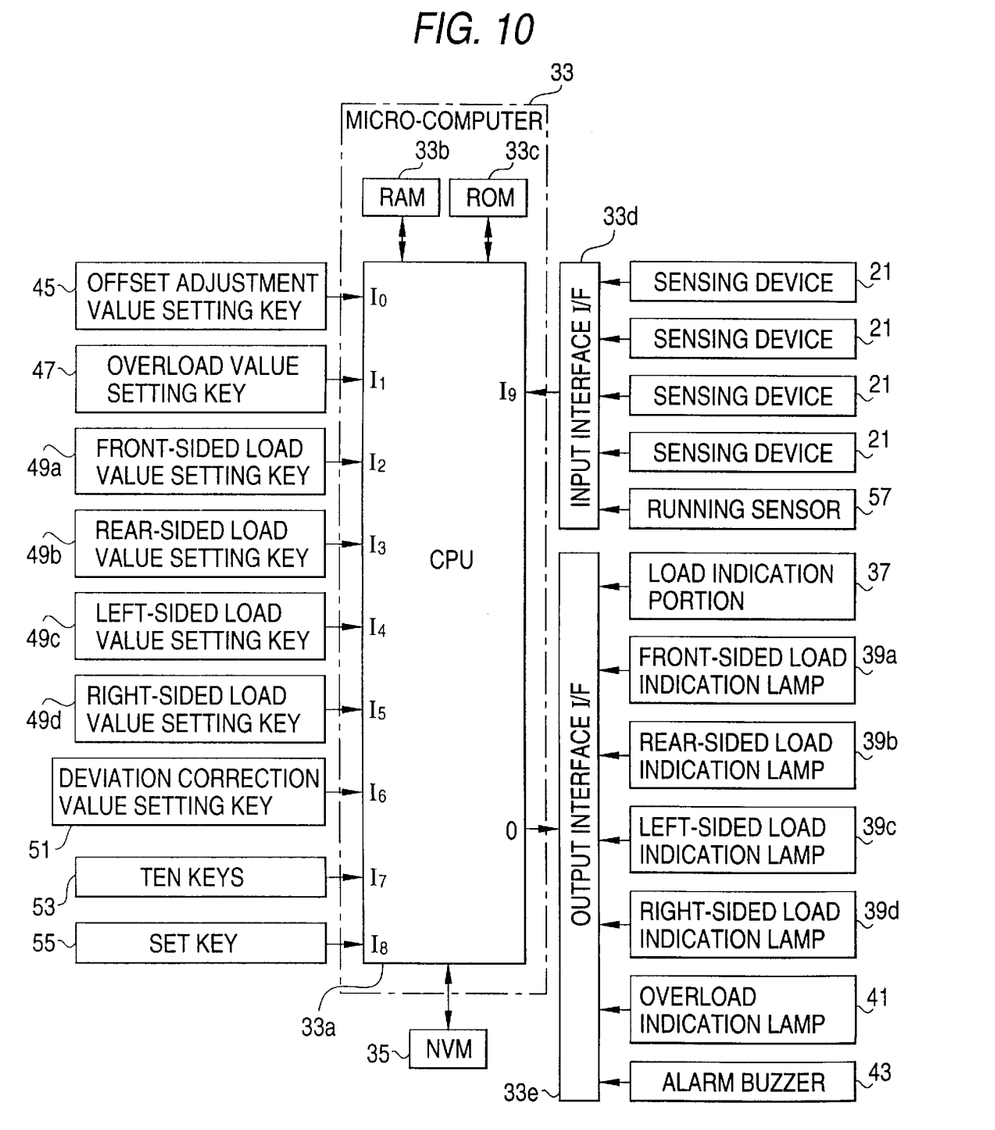
FIG. 10 is a block diagram showing the hardware configuration of a micro-computer depicted in FIG. 9.

As shown in FIG. 10, the micro-computer 33 is constituted by a central processing unit (CPU) 33a, a random access memory (RAM) 33b and a read-only memory (ROM) 33c.

A nonvolatile memory (NVM) 35 for preventing stored data from disappearing even in the case where an electric supply is turned off, the offset adjustment value setting key 45, the overload value setting key 47, the ten keys 53, the reset key 54 and the set key 55 are directly connected to the CPU 33a. Further, the respective sensing devices 21 and a running sensor 57 for generating running pulses correspondingly to the running of the vehicle 1 are connected to the CPU 33a through an input interface 33d.

Further, the load indication 37, the left-sided state, uniform state and right-sided state load indication lamps 40a to 40c, the overload indication lamp 41 and the alarm buzzer 43 are connected to the CPU 33a through an output interface 33e.

The RAM 33b has a data area for storing various kinds of data, and a work area for various kinds of processing. Control programs for making the CPU 33a perform various kinds of operations are stored in the ROM 33c.

Tables of offset adjustment values and characteristic correction values for the respective output pulse signals of the sensing devices 21, weighting coefficients q1 to q3 peculiar to the axles 9, used for calculating vehicle one-sided load values ρ (unit: %) which will be described later and which indicates the magnitude and direction of lateral deviation of load imposed on the vehicle 1, a table of gain correction values for the sum of frequencies of the output pulse signals of the sensing devices 21 after the offset adjustment and characteristic correction, load conversion equations, overload values and values for judgment of load deviation in the left and right directions are stored in the NVM 35 in advance.

Adjustment values in the offset adjustment value table are provided to eliminate the variations in frequency of the output pulse signals of the six sensing devices 21 in the tare state of the vehicle 1. The adjustment values are set for the sensing devices 21 respectively by a setting process in the tare state of the vehicle 1.

Each of the adjustment values for the sensing devices 21 is a difference (unit: Hz) between the frequency of the output pulse signal of the sensing device 21 in the tare state and the reference frequency 200 Hz of the pulse signal at the time the load is 0 ton. The specific range of the adjustment value is between +170 Hz and −500 Hz.

Accordingly, each of the sensing devices 21 which can be offset-adjusted by the adjustment values respectively is set so that the frequency of the output pulse signal in the tare state is in a range of from 30 Hz to 700 Hz.

Characteristic correction values in the characteristic correction value table are provided to correct the variations in characteristic of the sensing devices 21 which concerns the correlation between the loads imposed on the sensing devices 21 and the output pulse signals of the sensing devices 21. The characteristic correction values are set respectively for the sensing devices 21 in the stage before the sensing devices 21 are disposed in the respective shackle pins 17.

Each of the characteristic correction values for the sensing devices 21 is a correction coefficient by which the frequency of the output pulse signal of the sensing device 21 is multiplied so that the slope of a line indicating the correlation between the load imposed on the sensing device 21 and the output pulse signal of the sensing device 21 is made coincident with the slope of a line indicating the reference characteristic.

In the case where the sensing device 21 has non-linear characteristic so that the characteristic of the pulse signal changes from one characteristic to another characteristic correspondingly to the frequency band of the output pulse signal, a plurality of characteristic correction values to be applied to frequency bands between adjacent turning points are set for one sensing device 21.

The weighting coefficients q1 to q3 peculiar to the respective axles 9 are provided to give weight, correspondingly to the ratios of load distributed to the respective axles 9, to the wheelset deviation load values $\rho 1$ to $\rho 3$ (unit: %), which will be described later, which indicate the magnitude and direction of lateral deviation of loads imposed on the respective axles 9, and which are calculated on the basis of the frequencies of the output pulse signals of the sensing devices 21 after the offset adjustment and characteristic correction. The weighting coefficients q1 to q3 are set correspondingly to the structure of the vehicle 1 in advance.

In this embodiment, the weighting coefficient q1 of the front axle 9 is set to 0.1, the weighting coefficient q2 of the middle axle 9 is set to 0.2 and the weighting coefficient q3 of the rear axle 9 is set to 0.7.

The gain correction value table in the gain correction value table area is provided to correct the outputs of the sensing devices 21 to adjust the gains of the sensing devices 21 correspondingly to the error between the sum of the frequencies of the actual output pulse signals of the six sensing devices 21 and the sum of the frequencies of the originally expected output pulse signals of the sensing devices 21 in accordance with the loads imposed on the six sensing devices 21.

Further, first to sixth correction values Z1 to Z6 are stored in the gain correction value table so that one of the six correction values Z1 to Z6 is suitably selected on the basis of the combination of the deviation state of the load imposed on the vehicle 1 as to in which laterally (widthwise) deviated state the load is, among left-sided deviation, no-deviation, and right-sided deviation, and the running state of the vehicle 1 as to whether the vehicle 1 has run or not after the load measurement is performed previously.

The first, third and fifth correction values Z1, Z3 and Z5 are calculated as follows. Before the vehicle 1 is made to run, weights (not shown) of known weight values are placed successively on positions where the loads are evenly imposed on the respective sensing devices 21 on the carrier 7, on positions where loads are imposed on the respective sensing devices 21 in the left-sided state, and on positions where the loads are imposed on the respective sensing devices 21 in the right-sided state. The sum of the frequencies of the output pulse signals of the respective sensing devices 21 is measured at each of the load-mount states and then the first, third and fifth correction values Z1, Z3 and Z5 are respectively calculated in a manner so that the thus obtained sum values at each load-mount state is divided by the sum of the frequencies of the originally expected output pulse signals of the respective sensing devices 21 correspondingly to the weight values of the weights.

The second, fourth, and sixth correction values Z2, Z4 and Z6 are calculated as follows. Before the vehicle 1 is made to run, weights (not shown) of known weight values are placed successively on positions where the loads are evenly imposed on the respective sensing devices 21 on the carrier 7, on positions where loads are imposed on the respective sensing devices 21 in the left-sided state, and on positions where the loads are imposed on the respective sensing devices 21 in the right-sided state. After the vehicle 1 is made to run in this state and then stopped, the sum of the frequencies of the output pulse signals of the respective sensing devices 21 is measured at each of the load-mount states and then the second, fourth and sixth correction values Z2, Z4 and Z6 are respectively calculated in a manner so that the thus obtained sum values at each load-mount state is divided by the sum of the frequencies of the originally expected output pulse signals of the respective sensing devices 21 correspondingly to the weight values of the weights.the frequencies of the output pulse signals of the respective sensing devices 21 is measured at each of the respective positions where the known weight is placed. The first, third and fifth correction values Z1, Z3 and Z5 are respectively calculated in a manner so that the thus obtained sum values at various positions is divided by the sum of the frequencies of the originally expected output pulse signals of the respective sensing devices 21 in accordance with the weight values of the weights.

The work of constructing the database concerning the output characteristics of the sensing devices 21 used for calculating the characteristic correction values in the characteristic correction value table and the first to sixth correction values Z1 to Z6 will be described below with reference to FIGS. 1 through 4.

Figure 1:
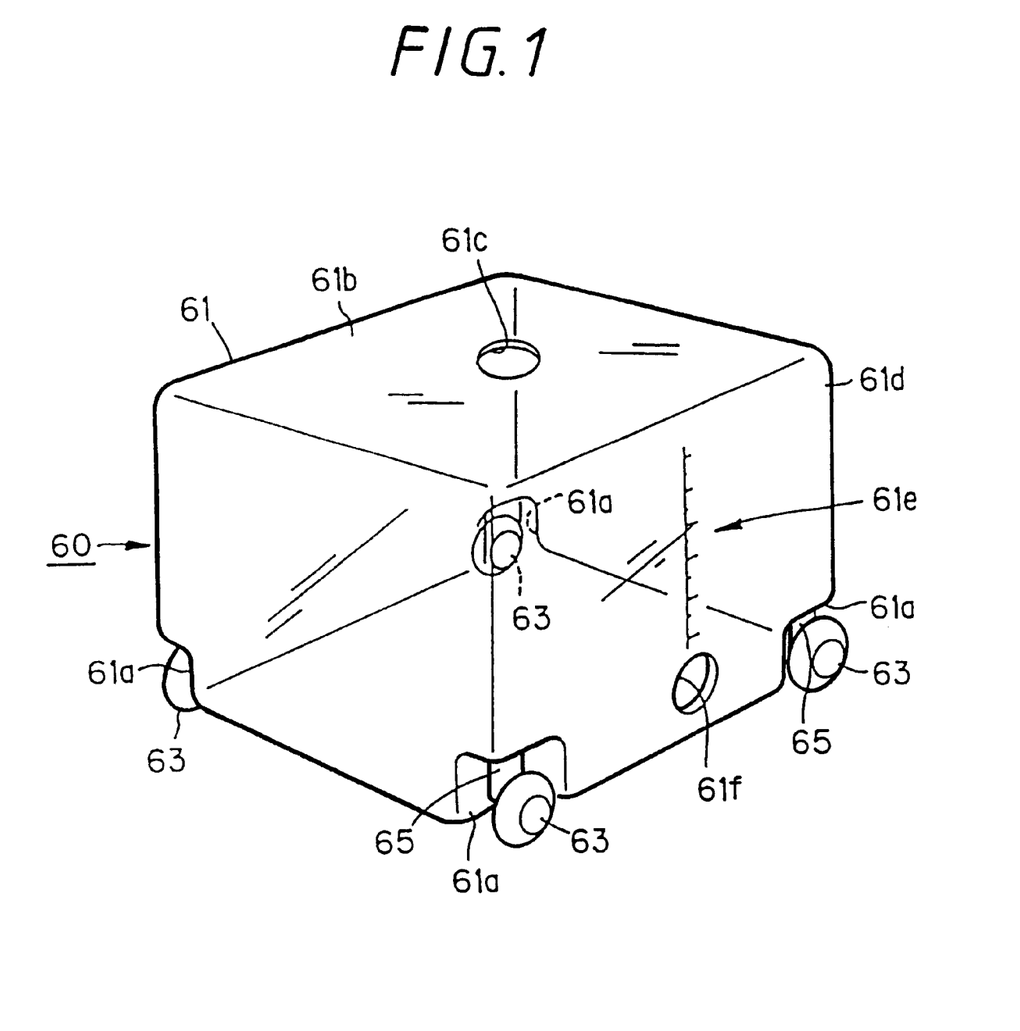
FIG. 1 is a perspective view of a weight vessel according to an embodiment of the present invention.

FIG. 1 is a perspective view of a water injection tank type weight vessel used as the aforementioned weight according to an embodiment of the present invention. In FIG. 1, the weight vessel 60 in this embodiment has a vessel body 61 shaped like a hollow box, caster wheels 63 attached to four corners of the lower portion of the vessel body 61.

The vessel body 61 is formed of, for example, a reinforced plastic film of transparent resin, semitransparent resin, or the like, so that the inside can be seen. Concave portions 61a (corresponding to the "corner portions of the vessel body") each of which has such a size that a corresponding caster wheel 63 can be received are formed in the lower four corner portions to where the caster wheels 63 are attached.

Further, a water injection port 61c (corresponding to the "injection inlet") is formed substantially in the center position of an upper surface 61b (corresponding to an upper portion of the vessel body) of the vessel body 61 so that water can be injected into the inside of vessel body 61. A scale 61e indicating the amount of water injected and reserved in the inside of the vessel body 61 is formed on one side 61d of the vessel body 61 (corresponding to the "side portion of the vessel body"). A drain port 61f (corresponding to the "discharge outlet") for discharging water from the inside of the vessel body 61 is formed at a position below the scale 61e and on the side surface 61d of the vessel body 61. As occasion demands, a water stopper (not shown), for example, which is formed of soft rubber serving also as a water sealing material is suitably attached to the drain port 61f.

Incidentally, the lower portion of the vessel body 61 at least containing the concave portions 61a is formed with such hardness that the rectangular shape as shown in FIG. 1 can be kept regardless of the reservation of water in the vessel body 61.

Further, it is a matter of course that the shape of the vessel body 61 is not limited to the box shape in this embodiment as shown in FIG. 1 and any shape such as a columnar shape, an undefined format bag shape, etc. may be used.

Further, the size of the vessel body 61 is preferably formed so that the weight of the weight body 60 takes an even value such as 1 ton, or the like, when the vessel body 61 is filled up with water.

Figure 2A:
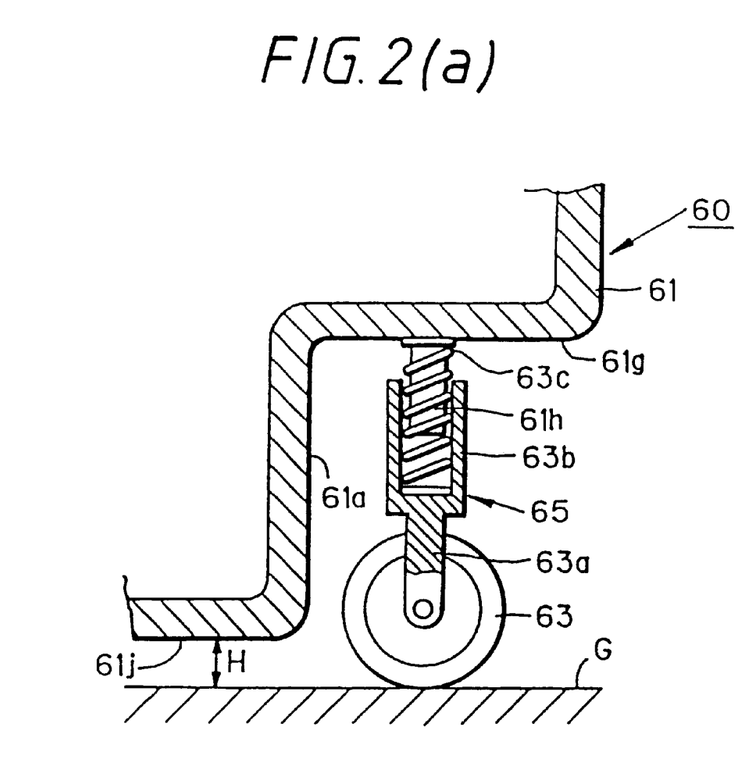

As shown in FIG. 2(a), each of the caster wheels 63 is configured so that a pipe-like receiving member 63b opened upward is integrally formed at the upper portion of a frame 63a of the caster wheel 63. A shock absorber 65 is constituted by a coiled spring 63c received in the receiving member 63b and a shaft 61h projected from a bottom surface 61g of the concave portion 61a of the vessel body 61 and having a forward end inserted into the coiled spring 63c.

As shown in FIG. 2(a), the shock absorber 65 is configured so that a gap H is formed between the upper end of the receiving member 63b and the bottom surface 61g of the concave portion 61a by means of the elastic force of the coiled spring 63c to thereby separate a bottom surface 61j of the vessel body 61 up far from the ground surface G of the caster wheel 63 because of the gap H in the condition that the vessel body 61 is empty of water. On the other hand, as shown in FIG. 2(b), the shock absorber 65 is configured so that the shaft 61h is inserted into the receiving member 63b against the elastic force of the coiled spring 63c by the weight of water per se contained in the inside of the vessel body 61 to thereby bring the bottom surface 61g of the concave portion 61a into contact with the upper end of the receiving member 63b and so as to bring the bottom surface 61j of the vessel body 61 into contact with the ground surface G of the caster wheel 63 in the condition that an amount of water not smaller than a predetermined value is reserved in the vessel body 61.

Figure 2B:
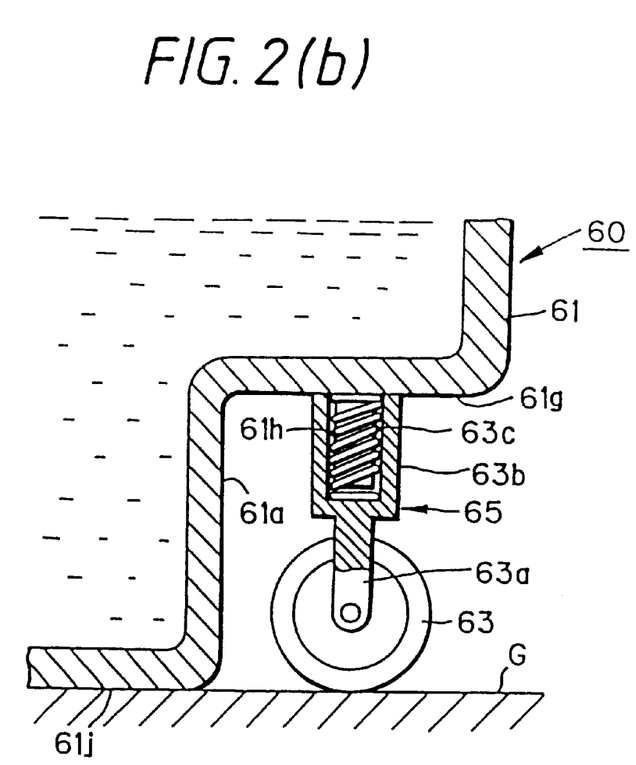

In the shock absorber 65 shown in FIGS. 2(a) and 2(b), the receiving member 63b corresponds to a contraction limiting member.

Figure 3:
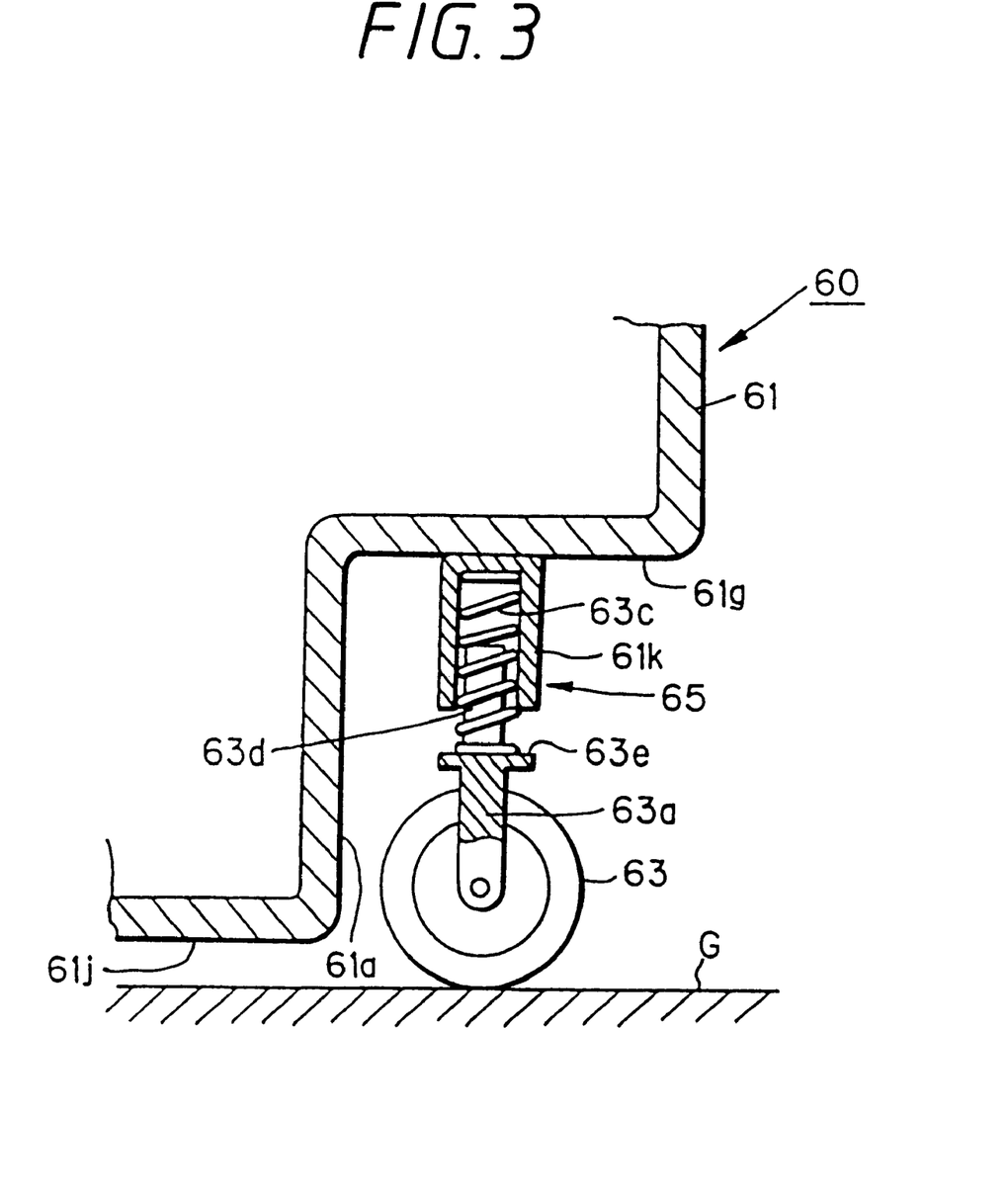
FIG. 3 is an explanatory view showing a modified configuration example of the caster wheel depicted in FIGS. 2(*a*)–2(*b*)

As shown in FIG. 3, the shock absorber 65 may be configured such that a pipe-like receiving member 61k opened downward is attached to the bottom surface 61g of the concave portion 61a so that the coiled spring 63c is received in the inside of the receiving member 61k and a shaft 63d projected from the upper end of the frame 63a of the caster wheel 63 is inserted into the coiled spring 63c.

In FIG. 3, the reference numeral 63e designates a flange projected from the outer circumference of the shaft 63d in order to receive the coiled spring 63c. In the shock absorber 65 shown in FIG. 3, the receiving member 61k and the flange 63e correspond to the contraction limiting member.

The procedure of constructing the database concerning the output characteristics of the sensing devices 21 by using a plurality of weight vessels 60 as defined above will be described below with reference to FIG. 4.

Figure 4:
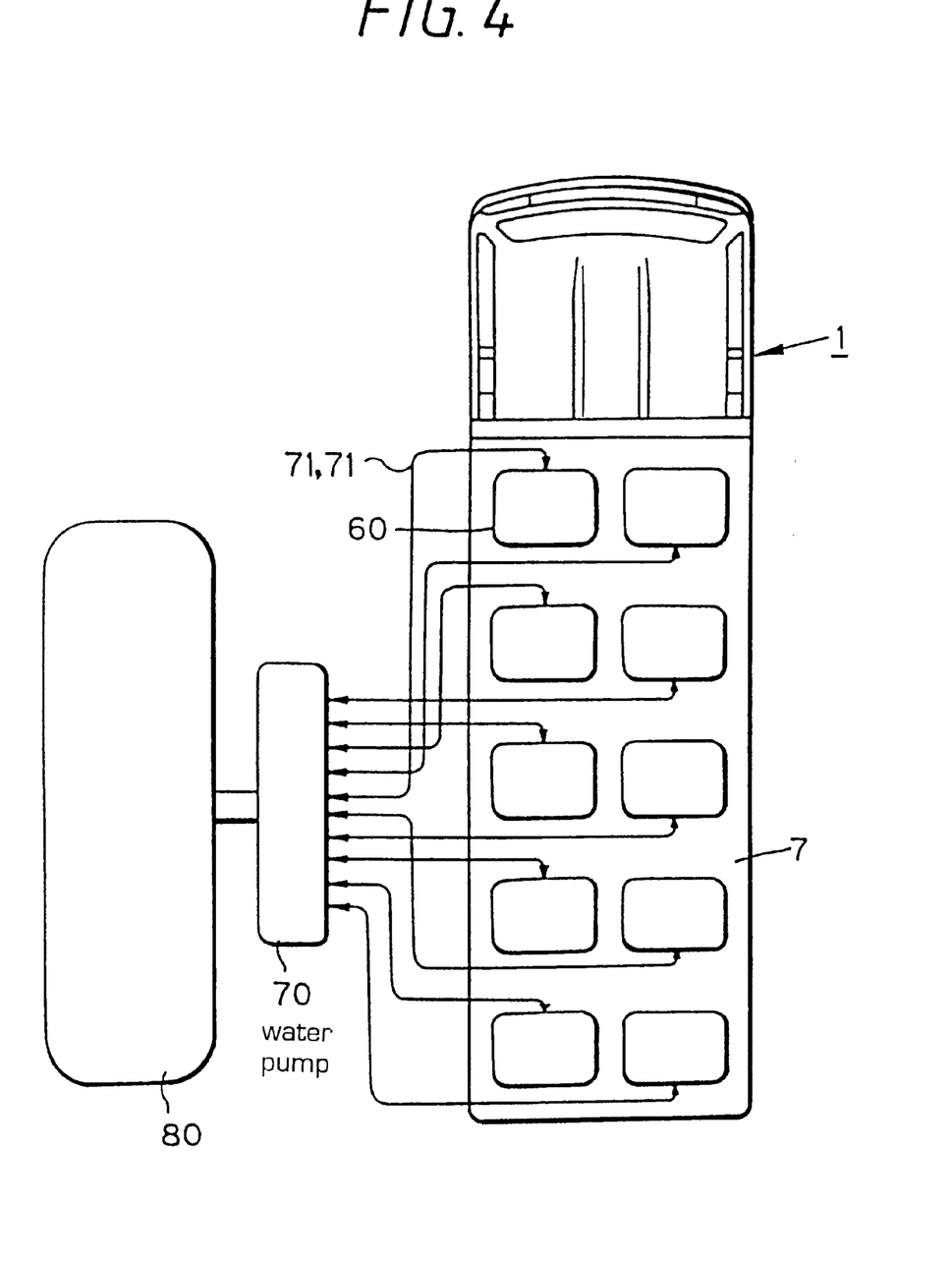
FIG. 4 is an explanatory view showing a procedure for constructing a database concerning output characteristics of load measurement sensing devices using a plurality of weight vessels.

As shown in FIG. 4, ten weight vessels 60 are mounted in the form of a matrix of two lines and five columns at both widthwise and lengthwise equal intervals and placed on the carrier 7 of the vehicle 1. A water supply pump 70 and a water tank 80 are disposed on a side of the vehicle 1.

Each weight vessel 60 and the water supply pump 70 are connected to each other by two hoses 71, 71 represented by one line in FIG. 4. One hose 71 connects the drain port 61f of the vessel body 61 of the weight vessel 60 to a water suction port (not shown) of the water supply pump 70 and the other hose 71 connects the water injection port 61c of the vessel body 61 to a water outlet (not shown) of a drain pump 70.

Incidentally, the gap between the outer circumference of the hose 71 connected to the drain port 61f of the weight vessel 60 and the inner circumference of the drain port 61f is sealed by a not-shown water sealing member so that water leakage is prevented.

In this condition, water is supplied from the water supply tank 80 to the weight vessels 60 or water is discharged from the weight vessels 60 to the water supply tank 80 by the water supply pump 70 to thereby increase/decrease amounts of water in the vessel bodies 61 of the weight vessels 60 step by step by a predetermined value while the amounts of water are made equal to each other. The frequencies of output signals of the sensing devices 21 at each step and the weight of each weight vessel 60 or the amount of water in each weight vessel 60 at that time are fetched into the computer not shown. These data are stored in an external or internal storage means. As a result, the database concerning the output characteristics of the sensing devices 21 is constructed.

Although the above description has been made about the case where the amounts of water in the vessel bodies 61 of the weight vessels 60 are increased/decreased by the water supply pump 70, the present invention can be applied also to the case where the amounts of water are increased/decreased manually without the water supply pump 70 while the respective scales 61e of the weight vessels 60 are observed.

Taking into consideration the differences between the output frequencies of the sensing devices 21 in the respective amounts of water in the database, the disposition of the sensing devices 21, etc., the characteristic correction values for the respective sensing devices 21 and the first to sixth correction values Z1 to Z6 are calculated by means of the computer on the basis of predetermined correction value calculation equations. The correction values thus calculated are stored in the NVM 35 of the load meter 31.

Although the above description has been made about the case where the processing work for constructing the database and calculating the characteristic correction values and the first to sixth correction values Z1 to Z6 may be performed by the computer not shown, the present invention can be applied also to the case where necessary programs are stored in the ROM 33c of the load meter 31 to operate the CPU 33a on the basis of the programs so that the processing work may be performed by the micro-computer 33.

In the weight vessel 60 configured as described above in this embodiment, the weight of the weight vessel 60 can be adjusted to an arbitrary value when the amount of water reserved in the vessel body 61 is adjusted. Furthermore, only by adjusting the amount of water, the weight of the weight vessel 60 can be increased/decreased in a delicate pitch.

Although the caster wheels 63 attached to the lower four corners of the vessel body 61 may be omitted, the caster wheels 63 function as follows if the caster wheels 63 are attached to the lower four corners of the vessel body 61. When the weight vessel 60 is placed or removed, the vessel body 61 can be made empty of water so that the weight of the weight vessel 60 is lightened. Further, when the caster wheels 63 are rotated in the condition that the bottom surface 61j of the vessel body 61 is separated up from the ground surface G of the caster wheels 63 by the shock absorber 65, the weight vessel 60 can be moved easily without any special equipment and without any dangerous work.

Further, such a configuration that when an amount of water not smaller than a predetermined value is reserved in the vessel body 61, the coiled spring 63c of the shock absorber 65 is contracted by the weight of the weight vessel 60 which is the sum of the weight of the vessel body 61 and the weight of water in the inside of the vessel body 61 so that the bottom surface 61j of the vessel body 61 is brought into close contact with the ground surface G of the caster wheels 63 may be omitted or replaced by wheel stoppers, or the like, attached to/detached from the caster wheels 63.

In the aforementioned configuration, when the weight of the weight vessel 60 is made heavy to some degree, the weight vessel 60 can be fixed onto the ground surface G of the carrier 7, or the like. Furthermore, because the bottom surfaces 61g of the concave portions 61a are brought into close contact with the upper ends of the receiving members 63b respectively in this condition, reaction force received in the shock absorber 65 from the ground surface G can be dispersed to and received by the whole of the vessel body 61. Accordingly, the reaction force (load) can be prevented from being concentrated into one place to damage the weight vessel 60, etc.

Furthermore, the shock absorber 65 per se can be also omitted. By providing the shock absorber 65, however, the load imposed on the support shaft of the caster wheel 63 can be relaxed by the elastic force of the coiled spring 63c.

Although the specific description about the correction process of the outputs of the sensing devices 21 using the aforementioned database and using the characteristic correction values and the first to sixth correction values Z1 to Z6 calculated on the basis of the database and the specific description about the calculation of load based on the outputs of the sensing devices 21 corrected by the aforementioned correction process are omitted, the details of these processes can follow the contents described preliminarily in the load calculation apparatus according to JP-A-7-58899 proposed by this Applicant.

Although this embodiment has been described upon the case where a scale 61e and a drain port 61f are formed in one side surface 61d of each vessel body 61, the present invention can be applied also to the case where a scale 61e and a drain port 61f are formed in two sides respectively or a plurality of scales 61e and a plurality of drain ports 61f are formed in two or more side surfaces, or any scale 61e is not provided.

Although this embodiment has been described about the case where caster wheels 63 are attached to and disposed at the lower four corners of the vessel body 61 through shock absorbers 65, the present invention may be applied also to the case where the shock absorbers 65 are omitted or both the shock absorbers 65 and the caster wheels 63 are omitted.

Although this embodiment has been described about the case where the whole of the vessel body 61 is formed from transparent resin or semitransparent resin so that the inside of the vessel body 61 can be seen through, the present invention may be applied also to the case where, for example, only the side 61d having the scale 61e and its vicinity are formed from transparent resin or semitransparent resin so that the inside of the vessel body 61 can been seen through while the other sides 61d are formed from opaque resin so that the inside of the vessel body 61 cannot be seen through.

Although this embodiment has been described about the case where the gain adjustment correction values Z1 to Z6 are provided to be separated from the characteristic correction values, the present invention may be applied also to the case where these values are collected to be one kind of correction values so that the weight vessels 60 are used when the database for calculation of the correction values collected to be one kind is constructed. In this case, if the characteristics of the sensing devices 21 change correspondingly to the frequency bands of the output pulse signals of the sensing devices 21, the gain adjustment correction values Z1 to Z6 may be set to different values corresponding to the frequency bands as occasion demands.

Although this embodiment has shown the case where the sensing devices 21 are disposed in the respective shackle pins 17, it is a matter of course that the locations of the sensing devices 21 are not limited to the positions shown in this embodiment, but they are freely selected so only as the sensing devices 21 are disposed in spindles of steering knuckles (in the case of steering wheels) or in the portions in the vehicle 1 in which the load is imposed from the carrier 7 onto the wheel 3.

Although this embodiment has been described about the case where six sensing devices 21 are provided because the number of wheels 3 is six and the number of axles 9 is three, that is, front, middle and rear axles are provided, it is a matter of course that the present invention can be applied also to a vehicle in which the number of wheels is not six, for example, four wheels 3 and two axles 9 are provided, etc., so long as the number of the sensing devices 21 corresponds to the number of the wheels.

Although this embodiment has been described about the case where magnetostriction type sensing devices 21 are used as the sensors, the present invention may be applied also to the case where weight measuring sensors having another configuration are used. Further, the subject of gain adjustment in accordance with the load deviation or the fact as to whether the vehicle 1 has run or not before the load measurement is not limited to the frequencies of the output pulse signals of the sensing devices 21 as described above in this embodiment. Other values may be used as the subject in accordance with the difference in configuration of the sensors such as the voltage level, the current level, the weight value after weight conversion, etc.

The liquid reserved in the vessel body 61 of the weight vessel 60 is not limited to water as described above in this embodiment, and any liquid higher or lower in specific gravity than water may be used as the liquid. So long as the specific gravity of the liquid is known, the weight of the liquid can be calculated on the basis of the amount of the reserved liquid recognized by the scale 61e so that the total weight of the weight vessel 61 can be managed on the basis of the sum of the weight of the weight vessel 61 and the weight of the liquid.

INDUSTRIAL UTILITY

As described above, according to the present invention, provided is a method of constructing an output characteristic correction database indicating output characteristics of a plurality of load measurement sensing devices disposed in a vehicle at portions supporting a carrier of the vehicle so that the database is to be used to calculate correction values for correcting the outputs of the sensing devices in accordance with vehicle characteristics determined on the basis of variations in output characteristic of the sensing devices and a structure of the vehicle, comprising the steps of: changing an amount of a liquid contained in a weight vessel placed on the carrier to thereby change weight of the weight vessel containing the liquid while making a value of the weight of the weight vessel containing the liquid known; and collecting and storing at least one of the amount of the liquid and the weight of the weight vessel while relating it to the outputs of the sensing devices whenever the amount of the liquid in the weight vessel is changed.

Therefore, the known weight of the weight vessel containing the liquid in the weight vessel is increased/decreased by increasing/decreasing the amount of the liquid in the weight vessel. Accordingly, the weights imposed on the sensing devices can be changed easily in an arbitrary pitch without requiring any troublesome balance weight increasing/decreasing work using a conveying apparatus such as a forklift, a crane, or the like, as in the conventional case where balance weights are used and without the necessity of separately preparing in advance various kinds of balance weights different in weight. Accordingly, the database indicating the changes of the output characteristics of the sensing devices corresponding to the changes of the weights imposed on the sensing devices can be constructed easily.

In the above method of constructing a database for correcting outputs of load measurement sensing devices, according to the present invention, a plurality of the weight vessels are placed at lengthwise and widthwise equal intervals on the carrier; and the outputs of the sensing devices are collected and stored so as to be related to at least one of the amounts of the liquid in the weight vessels and the weight values of the weight vessels in a condition that the weight values of the weight vessels are made equal to each other. Therefore, the balance of weight imposed on the carrier is made uniform by the plurality of weight vessels having weights made equal to each other, and the changes of the weights in the output characteristics of the sensing devices containing the influence of the vehicle characteristics determined on the basis of the structure of the vehicle can be collected easily and stored in the form of a database.

Further, according to the present invention, the above-mentioned weight vessel comprises: a vessel body shaped like a hollow box so that a liquid can be reserved in the inside of the vessel body; an injection inlet formed in an upper portion of the vessel body; a discharge outlet formed in a lower portion of the vessel body; and a scale formed on a side portion of the vessel body so as to indicate a value corresponding to the amount of the liquid reserved in the vessel body; wherein at least the side portion provided with the scale in side portions of the vessel body is formed of a transparent or semitransparent member so that the amount of the liquid in the vessel body can be seen through the transparent or semitransparent member.

Therefore, the amount of liquid reserved in a box-like vessel body can be confirmed easily by means of the scale provided at a side portion of the vessel body. Furthermore, by confirming the weight of the vessel body per se and the specific gravity of the liquid in advance, the weight of the whole of the vessel body can be calculated easily on the basis of the amount of the liquid in the vessel body observed by means of the scale.

Further, by making the vessel body empty, the weight vessel can be carried only with the light weight of the weight vessel per se. The weight vessel can be carried safely without use of any conveying apparatus such as a forklift, a crane, or the like, unlike the conventional case where balance weights are used. Further, the increase/decrease of the weight of the weight vessel can be performed easily by injecting the liquid into the vessel body through the injection inlet and discharging the liquid out of the vessel body through the discharge outlet.

In the above weight vessel, according to the present invention, rotatable caster wheels are attached to at least three corner portions on a lower end of the vessel body to thereby make the vessel moveable. Thus, by providing caster wheels at least at three corner portions so as to rotate on a lower end of the vessel body, the vessel body can be moved easily so as not to be lifted from the ground surface.

In the above weight vessel, according to the present invention, shock absorbers are interposed between corner portions of the vessel body and the caster wheels respectively so that the shock absorbers can be expanded/contracted to come near to/go far from a ground surface of the caster wheels and so that the vessel body is urged to go far from the ground surface with respect to the caster wheels against loads of the vessel body and the liquid in the vessel body. Accordingly, the carrying of the weight vessel can be performed easily by means of the rotation of the caster wheels.

In the above weight vessel, according to the present invention, the shock absorbers are contracted to bring the vessel body into contact with the ground surface when the amount of the liquid in the vessel body reaches a predetermined value, and wherein contraction limiting members are further provided so that the contraction of the shock absorbers is limited in the condition that the vessel body is brought into contact with the ground surface.

Therefore, by making the amount of the liquid in the vessel body reach a predetermined value to make the shock absorbers contract, the vessel body is brought into contact with the ground surface. Accordingly, if the weight of the weight vessel is increased to some degree, the weight vessel can be fixed by the contact of the vessel body with the ground surface. Furthermore, the contraction of the shock absorbers is limited by the contraction limiting members in this condition. Accordingly, the shock absorbers are prevented from being worn out and being damaged in the continuous contracting state due to continuous reception of overload.

What is claimed is:

1. A method of constructing an output characteristic correction database indicating output characteristics of a plurality of load measurement sensing devices disposed in a transport device at portions supporting a carrier of said transport device, comprising the steps of:

correcting the outputs of said sensing devices in accordance with transport device characteristics determined on the basis of variations in output characteristics of said sensing devices and a structure of said transport device, by use of weight vessels disposed on said carrier;

changing an amount of a liquid contained in the weight vessel to thereby change the weight of said weight vessel containing said liquid while making the value of the weight of said weight vessel containing said liquid known to said database; and collecting and storing at least one of the amount of the liquid and the weight of said weight vessel while relating it to the outputs of said sensing devices whenever the amount of the liquid in the weight vessel is changed.

2. The method of constructing a database for correcting outputs of load measurement sensing devices according to claim 1, wherein the weight vessel has a vessel body shaped like a hollow box so that a liquid can be reserved in the inside of said vessel body; an injection inlet formed in an upper portion of said vessel body; a discharge outlet formed in a lower portion of said vessel body; and a scale formed on a side portion of said vessel body so as to indicate a value corresponding to the amount of the liquid reserved in said vessel body, and wherein at least said side portion provided with said scale in side portions of said vessel body is formed of a transparent or semitransparent member so that the amount of the liquid in the vessel body can be seen through said transparent or semitransparent member.

3. A method of constructing an output characteristic correction database indicating output characteristics of a plurality of load measurement sensing devices disposed in a transport device at portions supporting a carrier of said transport device so that the database is to be used to calculate correction values for correcting the outputs of said sensing devices in accordance with variations in output characteristics of said sensing devices and the structure of said transport device, comprising the steps of:

changing an amount of a liquid contained in a weight vessel disposed on said carrier to thereby change the weight of said weight vessel containing said liquid while making the value of the weight of said weight vessel containing said liquid known; and collecting and storing at least one of the amount of the liquid and the weight of said weight vessel while relating it to the outputs of said sensing devices whenever the amount of the liquid in the weight vessel is changed, wherein a plurality of said weight vessels are placed at lengthwise and widthwise equal intervals on said carrier; and the outputs of said sensing devices are collected and stored so as to be related to at least one of the amounts of the liquid in the weight vessels and the weight values of the weight vessels while the weight values of said weight vessels are made to be equal to each other.

4. A method of constructing an output characteristic correction database indicating output characteristics of a plurality of load measurement sensing devices comprising the steps of:

correcting the outputs of said sensing devices in accordance with variations in output characteristics of said sensing devices by use of weight vessels;

changing an amount of a liquid contained in the weight vessel to thereby change the weight of said weight vessel containing said liquid while making the value of the weight of said weight vessel containing said liquid known to said database; and collecting and storing at least one of the amount of the liquid and the weight of said weight vessel while relating it to the outputs of said sensing devices whenever the amount of the liquid in the weight vessel is changed.

* * * * *